United States Patent [19]

Nonaka et al.

[11] Patent Number: 5,446,097
[45] Date of Patent: Aug. 29, 1995

[54] VULCANIZABLE RUBBER COMPOSITION AND VULCANIZED RUBBER

[75] Inventors: Shuichi Nonaka; Norihito Ueki; Takashi Mishima, all of Chiba, Japan

[73] Assignee: Mitsui Petrochemical Industries Ltd., Tokyo, Japan

[21] Appl. No.: 123,983

[22] Filed: Sep. 21, 1993

Related U.S. Application Data

[63] Continuation of Ser. No. 896,791, Jun. 9, 1992, abandoned, which is a continuation of Ser. No. 397,470, Aug. 11, 1989, abandoned.

[30] Foreign Application Priority Data

May 17, 1988 [JP] Japan ................. 63-119589

[51] Int. Cl.⁶ ............ C08L 23/08; C08L 23/16; C08L 25/08
[52] U.S. Cl. .................. 525/193; 525/232; 525/240; 525/241
[58] Field of Search ............. 525/240, 241, 193, 232

[56] References Cited

U.S. PATENT DOCUMENTS

| | | | |
|---|---|---|---|
| 3,627,856 | 12/1969 | Thienot | 525/194 |
| 3,875,095 | 4/1975 | Yamada et al. | 525/222 |
| 4,008,190 | 2/1977 | Taylor et al. | 525/194 |
| 4,687,810 | 8/1987 | Coran | 525/193 |

FOREIGN PATENT DOCUMENTS 2175079 10/1973 France .
1143458 12/1984 Japan ................. 525/192

OTHER PUBLICATIONS

*Materials and Compounding Ingredients for Rubber,* p. 174–Rubberworld Magazine, New York, N.Y. Jan. 1975.
The Vanderbilt Rubber Handbook Jan. 1958 p. 394 R. T. Vanderbilt Co. Inc. New York, N.Y.

*Primary Examiner*—W. Robinson Clark
*Attorney, Agent, or Firm*—Birch, Stewart, Kolasch & Birch

[57] ABSTRACT

A vulcanizable rubber composition comprising a conjugated diene rubber (A), an ethylene-alpha-olefin copolymer rubber (B) and a styrene oligomer (C) is provided. The composition is capable of providing a vulcanized rubber which is excellent not only in weather resistance and heat aging characteristics, but also in mechanical strength.

15 Claims, No Drawings

VULCANIZABLE RUBBER COMPOSITION AND VULCANIZED RUBBER

This application is a continuation of application Ser. No. 07/896,791 filed on Jun. 9, 1992, now abandoned which is a continuation of Ser. No. 07/397,470 filed Aug. 11, 1989, now abandoned.

FIELD OF THE INVENTION

The present invention relates to a vulcanizable rubber composition and to a vulcanized rubber. More particularly, it relates to a vulcanized rubber which is excellent in mechanical strength as well as in weather resistance and heat aging characteristics, and to a vulcanizable rubber composition capable of providing such a vulcanized rubber, which composition comprises a conjugated diene rubber, an ethylene-alpha-olefin copolymer rubber and a styrene oligomer.

BACKGROUND OF THE INVENTION

Weather resistance and heat aging characteristics of vulcanized conjugated diene rubbers such as natural rubbers (NR), isoprene rubbers (IR), styrene-butadiene rubbers (SBR) and butadiene rubbers are poor. Therefore various attempts to improve the weather resistance and heat aging characteristics of vulcanized conjugated diene rubbers are well known in the art by blending an ethylene-alpha-olefin copolymer rubber (EPDM) which is excellent in weather resistance and heat aging characteristics, with a conjugated diene rubber and vulcanizing the resulting blend. However, there has been involved such a problem that mutual vulcanization of the conjugated diene rubber and the EPDM becomes insufficient because of a slow vulcanization rate of the latter, thereby causing the mechanical strength of the resulting vulcanized rubber become poor.

It has now been found by the present inventors that a blend comprising the conjugated diene rubber, EPDM and a styrene oligomer, can provide a vulcanized rubber having satisfactory mechanical strength without reducing weather resistance and heat aging characteristics. The invention is based on this finding.

An object of the invention is to solve the above-mentioned problem associated with the prior art and another object of the invention is to provide a vulcanizable rubber composition capable of providing a vulcanized rubber which is excellent not only in weather resistance and heat aging characteristics, but also in mechanical strength. Still another object of the invention is to provide a vulcanized rubber which is obtained from the above-mentioned composition and which is excellent not only in weather resistance and heat aging characteristics but also in mechanical strength.

SUMMARY OF THE INVENTION

The vulcanizable rubber composition according to the invention comprises a conjugated diene rubber (A), an ethylene-alpha-olefin copolymer rubber (B) and a styrene oligomer (C). The vulcanized rubber according to the invention is obtained by vulcanizing the vulcanizable rubber composition which is excellent not only in weather resistance and heat aging characteristics but also in mechanical strength.

BEST MODE OF CARRYING OUT THE INVENTION

The vulcanizable rubber composition and vulcanized rubber obtained therefrom according to the invention will now be described in detail.

Conjugated diene rubbers (A)

The conjugated diene rubbers (A) which can be used herein are homopolymers of conjugated diene compounds or copolymers primarily comprised of polymerized units of conjugated diene compounds, and may be natural or synthetic rubbers. Suitable conjugated dienes include butadiene, isoprene and chloroprene. Suitable comonomers which may be copolymerized with such conjugated dienes are vinyl compounds, such as styrene and acrylonitrile.

Examples of preferred conjugated diene rubbers, which can be used herein, include, for example, natural rubbers (NR), butadiene rubbers (BR), isoprene rubbers (IR), styrene-butadiene rubbers (SBR), acrylonitrile-butadiene rubbers (NBR) and chloroprene rubbers (CR).

Ethylene-alpha-olefin copolymer rubbers (B)

The ethylene-alpha-olefin copolymer rubbers (B) used herein are rubbery copolymers of ethylene and at least one alpha-olefin, or rubbery copolymers of ethylene, at least one alpha-olefin and at least one polyene.

Suitable alpha-olefins which are copolymerized with ethylene to provide the ethylene-alpha-olefin copolymer rubbers (B), are those having from 3 to 10 carbon atoms. As the alpha-olefin, propylene, 1-butene, 1-pentene, 1-hexene, 4-methyl-1-pentene, 1-octene and 1-decene, can be used alone or in combination. Of these, propylene and 1-butene are particularly preferred.

The ethylene-alpha-olefin copolymer rubber (B) used herein may further contain units derived from at least one polyene compound in an amount that an iodine value of the rubber (B) does not exceed 50. Examples of suitable polyene compounds include, for example, acyclic non-conjugated diene compounds such as 1,4-hexadiene, 1,6-octadiene, 2-methyl-1,5-hexadiene, 6-methyl-1,5-heptadiene and 7-methyl-1,6-octadiene; cyclic non-conjugated diene compounds such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene and 6-chloromethyl-5-isopropenyl-2-norbornene; and triene compounds such as 2,3-diisopropylidene-5-norbornene, 2-ethylidene-3-isopropylidene-5-norbornene, 2-propenyl-2,2-norbornadiene, 1,3,7-octatriene and 1,4,9-decatriene. Of these, cyclic non-conjugated dienes, in particular dicyclopentadiene and 5-ethylidene-2-norbornene are preferred.

In the ethylene-alpha-olefin copolymer rubber (B) used herein, a molar ratio of ethylene to alpha-olefin (ethylene/alpha-olefin) is normally within the range of from 50/50 to 95/5 from the view point of strength and flexibility of the final vulcanized product. An optimum molar ratio of ethylene to alpha-olefin depends upon the particular alpha-olefin employed. For instance, in the case of propylene, it falls normally within the range from 50/50 to 90/10, in particular from 60/40 to 87/13, while in the case of an alpha-olefin having at least 4 carbon atoms, it falls normally within the range from 80/20 to 95/5, in particular from 85/15 to 95/5.

The vulcanizable rubber composition according to the invention comprises normally from 5 to 95 parts by weight of the conjugated diene rubber (A) and from 95 to 5 parts by weight of the ethylene-alpha-olefin copolymer rubber (B) with the proviso that the combined weight of the (A) and (B) is 100 parts, and preferably from 40 to 90 parts by weight of the conjugated diene rubber (A) and from 60 to 10 parts by weight of the ethylene-alpha-olefin copolymer rubber (B) with the proviso that the combined weight of the (A) and (B) is 100 parts.

Styrene oligomers (C)

By the term "styrene oligomers" used herein is meant oligomers derived from at least one styrenic monomer.

Thus, the styrene oligomers (C) which can be used herein include homopolymers and copolymers of styrchic monomers such as styrene, alpha-methylstyrene, vinyltoluenes and isopropenyltoluenes (IPT). Furthermore, in the practice of the invention use can be made as to the styrene oligomer (C) of oligomers prepared by copolymerization of at least 80% by weight of at least one styrenic monomer with up to 20% by weight of a so-called $C_5$ petroleum fraction which is obtained by pyrolysis of naphtha and comprises isoprene and cyclopentadiene.

The styrene oligomer (C) used herein has a number average molecular weight Mn of normally from 400 to 2,000, preferably from 500 to 1,500.

The vulcanizable rubber composition according to the invention is incorporated with the styrene oligomer (C) in an amount of normally from 1 to 50 parts by weight, preferably from 5 to 40 parts by weight, based on 100 parts of the combined weight of the conjugated diene rubber (A) and the ethylene-alpha-olefin copolymer rubber (B).

In addition to the above-mentioned components (A), (B) and (C), the vulcanizable rubber composition according to the invention may be incorporated with softeners, rubber reinforcing agents, fillers, vulcanizing agents, vulcanization accelerators, auxiliary vulcanizing agents and other additives as long as the purpose of the invention is not hindered.

Preparation of vulcanized rubbers

The composition according to the invention can be processed to provide a vulcanized rubber in the same manner as in conventional processes for vulcanizing rubber. More particularly, the composition according to the invention is compounded with suitable additives in the manner as hereinafter described to provide an unvulcanized rubber compound, which is formed to a desired article and then vulcanized.

Depending upon the intended use and desired properties of the vulcanized rubber product, the particular proportions of the components (A), (B) and (C), types and loadings of any softening agent, rubber reinforcing agent and filler, kinds and loadings of compounds constituting the vulcanization system including the vulcanizing agent, vulcanization accelerator and auxiliary vulcanizing agent as well as vulcanization process and conditions are appropriately selected.

As the softening agent, use can be made of those normally used in the rubber industry, including, for example, petroleum softening agents such as process oil, lubricating oil, paraffin, fluid paraffin, petroleum asphalt and vaseline; coal tar softening agents such as coal tar and coal tar pitch; fatty oil softening agents such as castor oil, linseed oil, rapeseed oil and coconut oil; tall oil; factic; waxes such as beeswax, carnauba wax and laurin; fatty acids and their salts such as ricinoleic acid, palmitic acid, barium stearate, calcium stearate and zinc laurate; and synthetic polymeric substances such as petroleum resins, atactic polypropylene and coumarone-indene resins. Of these, petroleum softening agents, in particular, process oil is preferred.

As the rubber reinforcing agent, there can be used fine particulate silicic acid and various carbon blacks such as SRF, GPF, FEF, HAF, ISAF, SAF, FF and MT.

Upon preparation of the vulcanized rubber according to the invention sulfur compounds and organic peroxides are used as the vulcanizing agent. Examples of the sulfur compounds which can be used as the vulcanizing agent include, for example, sulfur, sulfur monochloride, sulfur dichloride, morpholine disulfide, alkylphenol disulfide, tetramethylthiuronium disulfide and selenium dimethyldithiocarbamate. Of these, sulfur is preferred.

The sulfur compounds are used in an amount of from 0.1 to 10 parts by weight, preferably from 0.5 to 5 parts by weight, based on 100 parts of the combined weight of the conjugated diene rubber (A) and ethylene-alpha-olefin copolymer rubber (B).

Examples of the organic peroxides which can be used as the vulcanizing agent include, for example, dicumyl peroxide, 2,5-dimethyl-2,5-di-(tert.-butylperoxy)hexane, 2,5-dimethyl-2,5-di-(benzoylperoxy)hexane, 2,5,-dimethyl-2,5-di-(tert.-butylperoxy)hexyne-3, di-tert.-butyl peroxide, di-tert.-butylperoxy- 3,3,5-trimethylcyclohexane and tert.-butyl hydroperoxide. Of these, dicumyl peroxide, di-tert.-butyl peroxide and di-tert.-butylperoxy-3,3,5-trimethylcyclohexane are preferred.

When the above-mentioned sulfur compounds are used as the vulcanizing agent upon preparation of the vulcanized rubber according to the invention, a vulcanization accelerator is preferably co-used. Examples of the vulcanization accelerators which can be used herein include, for example, thiazole compounds such as N-cyclohexyl-2-benzothiazole-sulfenamide, N-oxydiethylene-2-benzothiazole-sulfenamide, N,N-diisopropyl-2-benzothiazole-sulfenamide, 2-mercaptobenzothiazole, 2-(2,4-dinitrophenyl) mercaptobenzothiazole, 2-(2,6-diethyl-4-morpholinothio) benzothiazole and dibenzothiazole disulfide; guanidine compounds such as diphenylguanidine, triphenylguanidine, di-o-tolylguanidine, o-tolyl biguanide and diphenylguanidine phthalate; aidehyde-amine and aidehyde-ammonia reaction products such as acetaldehyde-aniline reaction product, butylaldehyde-aniline condensation product, hexamethylenetetramine and acetaldehyde-ammonia reaction product; imidazoline compounds such as 2-mercaptoimidazoline; thiourea compounds such as thiocarbanilide, diethylthiourea, dibutylthiourea, trimethylthiourea and di-o-tolylthiourea; thiuram compounds such as tetramethylthiuram monosulfide, tetramethylthiuram disulfide, tetraethylthiuram disulfide, tetrabutylthiuram disulfide and pentamethylenethiuram tetrasulfide; salts of dithio acids such as zinc dimethyldithiocarbamate, zinc diethyldithiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate and tellurium diethyldithiocarbamate; xanthate compounds such as zinc dibutylxanthate; and zinc flower.

The above-mentioned vulcanization accelerators are used in an amount of from 0.1 to 20 parts by weight, preferably from 0.2 to 10 parts by weight, based on 100 parts of the combined weight of the conjugated diene rubber (A) and ethylene-alpha-olefin copolymer rubber (B).

When the above-mentioned organic peroxides are used as the vulcanizing agent upon preparation of the vulcanized rubber according to the invention, an auxiliary vulcanizing agent is preferably co-used. Examples of the auxiliary vulcanizing agents which can be used herein include, for example, sulfur, quininedioxime compounds such as p-benzoquinonedioxime, methacrylate compounds such as polyethyleneglycol dimethacrylate, allyl compounds such as diallyl phthalate and triallyl cyanurate, maleimide compounds and divinylbenzene.

The unvulcanized rubber compound may be prepared as follows. The components (A), (B) and (C) and any filler and softening agent are admixed and kneaded at a temperature of from about 80° to 170° C. for a period of from 3 to 10 minutes using a mixer such as a Bumbury's mixer. The resulting admixture is then admixed and kneaded together with an added vulcanizing agent, and any added vulcanization accelerator and auxiliary vulcanizing agent, when used, at a temperature of about 40° to 80° C. for a period of 5 to 30 minutes, using rolls such as open rolls. The resulting composition is finally extruded to provide the unvulcanized rubber compound in the form of a ribbon or a sheet.

The rubber compound so prepared is then formed into a desired shape by means of an extruder, calender rolls or press, and heated at a temperature of from 150° to 270° C. for a period of 1 to 30 minutes to provide a vulcanized rubber product at the same time of or subsequent to the forming. In the latter case, a separate vulcanizing vessel is used. Upon vulcanization a mold may or may not be used. When a mold is not used, the steps of forming and vulcanization are usually carried out continuously.

The heating in the vulcanizing vessel may be carried out by means of hot air, a fluidized bed of glass beads, UHF (ultrashort high frequency) or steam.

Effect of the Invention

The vulcanizable rubber composition according to the invention comprising a conjugated diene rubber (A), an ethylene-alpha-olefin copolymer rubber (B) and a styrene oligomer (C), provides a vulcanized rubber which is excellent not only in weather resistance and heat aging characteristics but also in mechanical strength.

EXAMPLES

While the invention will now be described by the following examples, it should be appreciated that the invention is in no way restricted to the examples.

The number average molecular weight Mn of a styrene oligomer referred to in the examples was determined from a chromatograph pattern of a given sample obtained under conditions including a solvent of THF and a temperature of 40° C. using an HLC 802R type high speed liquid chromatography supplied by TOYO Soda K. K. with columns: G4000H$_8$, G3000H$_8$ and two G2000H$_8$, all manufactured by the same company. The corelation diagram calibration curve was prepared using monodispersed polystyrenes.

Example 1

A 4.3 liter Bumbury's mixer (OOC type, supplied by KOBE Steel Works K. K.) was charged with 70 parts by weight of SBR as the diene copolymer rubber (A) having a styrene content of 24% by weight, and a Mooney viscosity (ML$_{1+4}$, 100° C.) of 52; 30 parts by weight of EPT as the ethylene-alpha-olefin copolymer rubber (B) having an ethylene/propylene molar ratio of 66/34, ethylidenenorbornene as a diene component, an iodine value of 22 and a Mooney viscosity (ML$_{1+4}$, 100° C.) of 85; 10 parts by weight of a copolymer of isopropenyltoluene (IPT) and C$_5$ petroleum fraction as the styrene oligomer (C) having an IPT content of 95% by weight and a number average molecular weight Mn of about 750; 5 parts by weight of zinc flower; 1 part by weight of stearic acid; 55 parts by weight of FEF carbon black ("SEAST" supplied by TOKAI Carbon K. K.) and 15 parts by weight of silica ("TOKUSIL GU" supplied by TOKUYAMA Soda K. K.) as the rubber reinforcing agents; and 25 parts by weight of a paraffin oil ("DIANA PROCESS PW-90") as the softening agent, and the resulting mixture was admixed at a temperature of 130° C. for a period of 6 minutes to provide a kneaded admixture.

The admixture so obtained was further kneaded together with 1.5 parts by weight of sulfur as the vulcanizing agent and 1.5 parts by weight of N-cyclohexyl-2-benzothiazolesulfenamide (CBS supplied by OHUCHI SHINKOH Chemicals K. K.) as the vulcanization accelerator for a period of 10 minutes with open rolls, each roll having a diameter of 8 inches and a length of 20 inches, maintained at a temperature of 60° C. to provide a rubber compound.

The rubber compound thus obtained was pressed and heated to provide a vulcanized rubber sheet using a vulcanizing press under conditions including a plate temperature of 160° C., a pressing pressure of 100 kg/cm$^2$ and a pressing time of 30 minutes.

The vulcanized rubber sheet so prepared was conditioned in a constant temperature room maintained at 25° C. for a period of 24 hours and thereafter subjected to the following hardness and tensile tests.

Hardness test

Hardness (JIS A) is measured on a stack of 6 vulcanized sheets, using a JIS A hardness tester in accordance with a method described in JIS K 6301 (Methods for testing physical properties of vulcanized rubber), paragraph 5-2 (Spring hardness test).

Tensile test

Tensile stress at break TB and tensile elongation at break E$_B$ are determined on a No. 3 dumbbell specimen described in JIS K 6301 punched from a vulcanized sheet, in accordance with a method described in paragraph 3 of JIS K 6301 at a temperature of 25° C. with a tensile rate of 500 mm/min.

The results are shown in Table 1.

Example 2

A vulcanized rubber sheet was prepared and subjected to the hardness and tensile tests as in Example 1, except that the copolymer of isopropenyltoluene (IPT) and C$_5$ petroleum fraction was used in an amount of 20 parts by weight and the paraffin oil was used in an amount of 15 parts by weight.

The results are shown in Table 1.

Comparative Example 1

A vulcanized rubber sheet was prepared and subjected to the hardness and tensile tests as in Example 1, except that the copolymer of isopropenyltoluene (IPT) and C5 petroleum fraction was not used and the paraffin oil was used in an amount of 35 parts by weight for a purpose of achieving the substantially same hardness as in Example 1.

The results are shown in Table 1.

Example 3

A vulcanized rubber sheet was prepared and subjected to the hardness and tensile tests as in Example 2, except that the 20 parts by weight of the copolymer of isopropenyltoluene (IPT) and C5 petroleum fraction was replaced with 20 parts by weight of a styrene oligomer ("Highmet-ST-95" supplied by SANYO Chemical Industries K. K.)

The results are shown in Table 1.

TABLE 1

| Properties of vulcanized rubber | | | | |
|---|---|---|---|---|
| | Example 1 | Example 2 | Comp. Ex. 1 | Example 3 |
| Hardness (JIS A) | 56 | 57 | 56 | 65 |
| Tensile stress at break TB [kgf/cm$^2$] | 125 | 138 | 93 | 130 |
| Elongation at break EB [%] | 440 | 540 | 410 | 450 |

Example 4

A 4.3 liter Bumbury's mixer (OOC type, supplied by KOBE Steel Works K. K.) was charged with 70 parts by weight of NBR as the diene copolymer rubber (A) having an acrylonitrile content of 33% by weight, and a Mooney viscosity (ML$_{1+4}$, 100° C.) of 78; 42 parts by weight of EPT as the ethylene-alpha-olefin copolymer rubber (B) having an ethylene/propylene molar ratio of 78/22, ethylidenenorbornene as a diene component, an iodine value of 13, a Mooney viscosity (ML$_{1+4}$, 100° C.) of 70 and containing 40% by weight of an oil extender; 20 parts by weight, that is 17.8 parts by weight based on 100 parts of the combined weight of the (A) and (B), of a copolymer of isopropenyltoluene (IPT) and C5 petroleum fraction as the styrene oligomer (C) having an IPT content of 95% by weight and a number average molecular weight Mn of about 750; 5 parts by weight of zinc flower; 1 part by weight of stearic acid; 65 parts by weight of ISAF carbon black ("SHIEST 600" supplied by TOKAI Carbon K. K.) as the rubber reinforcing agent; and 5 parts by weight of a paraffin oil ("DIANA PROCESS PW-90") as the softening agent, and the resulting mixture was admixed at a temperature of 130° C. for a period of 6 minutes to provide a kneaded admixture.

The admixture so obtained was further kneaded together with 1.5 parts by weight of sulfur as the vulcanizing agent and 1.5 parts by weight of N-cyclohexyl-2-benzothiazolesulfenamide (CBS supplied by OHUCHI SHINKOH Chemicals K. K.) as the vulcanization accelerator for a period of 10 minutes with open rolls, each roll having a diameter of 8 inches and a length of 20 inches, maintained at a temperature of 60° C. to provide a rubber compound.

The rubber compound was pressed and heated to provide a vulcanized rubber sheet using a vulcanizing press under conditions including a plate temperature of 160° C., a pressing pressure of 100 kg/cm$^2$ and a pressing time of 30 minutes.

The vulcanized rubber sheet so prepared was conditioned in a constant temperature room maintained at 25° C. for a period of 24 hours and thereafter subjected to the above-mentioned hardness and tensile tests.

The results are shown in Table 2.

TABLE 2

| Properties of vulcanized rubber | |
|---|---|
| | Example 4 |
| Hardness (JIS A) | 72 |
| Tensile stress at break T$_B$ [kgf/cm$^2$] | 121 |
| Elongation at break E$_B$ [%] | 330 |

We claim:

1. A vulcanizable rubber composition which consists essentially of from 5 to 95 parts by weight of a conjugated diene rubber (A), from 95 to 5 parts by weight of an ethylene-alpha-olefin copolymer rubber (B), the combined weight of (A) and (B) being 100 parts, and from 1 to 50 parts by weight, based on 100 parts of the combined weight of the conjugated diene rubber (A) and the ethylene-alpha-olefin copolymer rubber (B), of a styrene oligomer (C) prepared by the copolymerization of at least 80% by weight of at least one styrenic monomer, with 5 to 20% by weight of C5 petroleum fraction, wherein the styrene oligomer (C) has a number average molecular weight Mn of 400 to 2,000.

2. The vulcanizable rubber composition according to claim 1, wherein the styrene oligomer (C) is an oligomer of a styrenic monomer selected from the group consisting of styrene, alpha-methylstyrene, vinyltoluene and isopropenyltoluene.

3. The vulcanizable rubber composition according to claim 1, wherein the styrene oligomer (C) is present in an amount of from 5 to 40 parts by weight, based on 100 parts of the combined weight of (A) and (B).

4. The vulcanizable rubber composition according to claim 1 or 3, wherein the conjugated diene rubber (A) is present in an amount of from 40 to 90 parts by weight, and the ethylene-alpha-olefin copolymer rubber (B) is present in an amount of from 60 to 10 parts by weight, based on 100 parts of the combined weight of (A) and (B).

5. The vulcanizable rubber composition according to claim 1, wherein the conjugated diene rubber (A) is selected from the group consisting of a natural rubber, a butadiene rubber, an isoprene rubber, a styrene-butadiene rubber, an acrylonitrile-butadiene rubber and a chloroprene rubber.

6. The vulcanizable rubber composition according to claim 1, wherein the alpha-olefin of the ethylene-alpha-olefin copolymer (B) is an alpha-olefin having 3 to 10 carbon atoms.

7. The vulcanizable rubber composition according to claim 1, wherein the alpha-olefin of the ethylene-alpha-olefin copolymer (B) is an alpha-olefin selected from the group consisting of propylene, 1-butene, 1-pentene, 1-hexene, 4-methyl-l-pentene, 1-octene and 1-decene.

8. The vulcanizable rubber composition according to claim 1, wherein the ethylene-alpha-olefin copolymer rubber (B) further comprises units of at least one polyene compound in an amount that an iodine value of the rubber (B) does not exceed 50.

9. The vulcanizable rubber composition according to claim 8, wherein the polyene compound is selected from the group consisting of an acyclic non-conjugated diene compound, a cyclic non-conjugated diene compound and a triene compound.

10. The vulcanizable rubber composition according to claim 8, wherein the polyene compound is selected from the group consisting of 1,4-hexadiene, 1,6-octadiene, 2-methyl-1,5-hexadiene, 6-methyl-1,5-heptadiene, 7-methyl-1,6-octadiene, cyclohexadiene, dicyclopentadiene, methyltetrahydroindene, 5-vinylnorbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene, 2-propenyl-2,2-norbornadiene, 1,3,7-octatriene and 1,4,9-decatriene.

11. A vulcanizable rubber composition which consists essentially of a conjugated diene rubber (A); an ethylene-alpha-olefin copolymer rubber (B); and a styrene oligomer (C) prepared by the copolymerization of at least 80% by weight of at least one styrenic monomer, with 5 to 20% by weight of a C$_5$ petroleum fraction; wherein the styrene oligomer (C) has a number average molecular weight (Mn) of from 400 to 2,000, and is present in an amount of from 5 to 40 parts by weight, based on 100 parts of the combined weight of (A) and (B).

12. A vulcanized rubber obtained by vulcanizing a vulcanizable composition which consists essentially of conjugated diene rubber (A); an ethylene-alpha-olefin copolymer rubber (B); and a styrene oligomer (C) prepared by the copolymerization of at least 80% by weight of at least one styrenic monomer, with 5 to 20% by weight of a C$_5$ petroleum fraction, wherein the styrene oligomer (C) has a number average molecular weight (Mn) of from 400 to 2,000, and is present in an amount of from 5 to 40 parts by weight, based on 100 parts of the combined weight of (A) and (B).

13. A vulcanized rubber obtained by vulcanizing a vulcanizable composition which consists essentially of from 5 to 95 parts by weight of a conjugated diene rubber (A), from 95 to 5 parts by weight of an ethylene-alpha-olefin copolymer rubber (B), the combined weight of (A) and (B) being 100 parts, and from 1 to 50 parts by weight, based on 100 parts of the combined weight of the conjugated diene rubber (A) and the ethylene-alpha-olefin copolymer rubber (B), of a styrene oligomer (C) prepared by the copolymerization of at least 80% by weight of at least one styrenic monomer, with 5 to 20% by weight of C$_5$ petroleum fraction, wherein the styrene oligomer (C) has a number average molecular weight Mn of 400 to 2,000.

14. The vulcanized rubber according to claim 13, wherein the styrene oligomer (C) in the vulcanizable composition is present in an amount of from 5 to 40 parts by weight, based on 100 parts of the combined weight of (A) and (B).

15. The vulcanized rubber according to claim 13 or 14, wherein the conjugated diene rubber (A) is present in an amount of from 40 to 90 parts by weight and the ethylene-alpha-olefin copolymer rubber (B) is present in an amount of from 60 to 10 parts by weight, the combined weight of (A) and (B) being 100 parts in the vulcanizable rubber composition.

* * * * *